(12) United States Patent
Sasaki

(10) Patent No.: US 12,366,283 B2
(45) Date of Patent: Jul. 22, 2025

(54) SPEED REDUCER

(71) Applicant: NIPPON THOMPSON CO., LTD., Tokyo (JP)

(72) Inventor: Satoshi Sasaki, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 18/287,930

(22) PCT Filed: Mar. 24, 2022

(86) PCT No.: PCT/JP2022/013941
§ 371 (c)(1),
(2) Date: Oct. 23, 2023

(87) PCT Pub. No.: WO2022/249700
PCT Pub. Date: Dec. 1, 2022

(65) Prior Publication Data
US 2025/0092937 A1    Mar. 20, 2025

(30) Foreign Application Priority Data
May 25, 2021  (JP) ................. 2021-087529

(51) Int. Cl.
*F16H 1/32*  (2006.01)
*F16H 57/04*  (2010.01)

(52) U.S. Cl.
CPC .......... *F16H 1/32* (2013.01); *F16H 57/0406* (2013.01); *F16H 57/0486* (2013.01); *F16H 2001/325* (2013.01)

(58) Field of Classification Search
CPC .......... F16H 2001/325; F16H 57/0406; F16H 57/0486
See application file for complete search history.

(56) References Cited

U.S. PATENT DOCUMENTS 11,365,786 B2 *  6/2022  Fecko .................. F16H 1/32
2017/0059029 A1  3/2017  Sasaki

FOREIGN PATENT DOCUMENTS

JP      H08-3733 Y2      1/1996
JP      2003-021198 A    1/2003
(Continued)

OTHER PUBLICATIONS

Jun. 14, 2022 Search Report issued in International Patent Application No. PCT/JP2022/013941.

*Primary Examiner* — Huan Le
(74) *Attorney, Agent, or Firm* — Oliff PLC

(57) ABSTRACT

A speed reducer includes: ring-shaped external gear including outer teeth and through holes arranged circumferentially; input shaft penetrating space surrounded by an external gear inner circumferential surface; bearing between the external gear and input shaft; ring-shaped internal gear surrounding an external gear outer circumferential surface; inner pins penetrating the through holes axially; and inner pin holder holding both ends of each inner pin. The inner pin holder includes: first holder portion including a ring-shaped holding portion holding a first end of each inner pin; second holder portion including a ring-shaped holding portion holding a second end of each inner pin; and pillars connecting the first and second holder portion and penetrating the through holes. The speed reducer further includes fixing members that fix pillar end surfaces to the first holder portion or the second holder portion and are inserted in the pillars from the end surfaces of the pillars.

6 Claims, 15 Drawing Sheets

(56) References Cited

FOREIGN PATENT DOCUMENTS

| JP | 2006226370 A | * | 8/2006 | ......... F16H 57/0406 |
| JP | 2017-048852 A | | 3/2017 | |
| JP | 2017-067276 A | | 4/2017 | |

* cited by examiner

SPEED REDUCER

TECHNICAL FIELD

The present disclosure relates to a speed reducer. The present disclosure relates to a speed reducer. This application claims priority to Japanese Patent Application No. 2021-087529, which was filed on May 25, 2021, and is incorporated herein by reference in its entirety.

BACKGROUND ART

Speed reducers have been used to date for control units for driving wheels in mobile devices, robots, and machine tools. Patent Literature 1, for example, describes a technique of this type.

A speed reducer described in Patent Literature 1 includes an input shaft including a pair of eccentric portions, a pair of cycloid gears to be in contact with the eccentric portions, a hub serving as an output shaft, an output shaft pin holder, a plurality of outer pins, an outer pin holder holding the outer pins, and an inner pin supported by the hub. The inner pin includes a shaft, an outer ring rotatably disposed to the shaft, and a roller that rolls between the shaft and the outer ring. Both ends of the shaft are fixed to the hub and the output shaft pin holder with fixing bolts.

CITATION LIST

Patent Literature

Patent Literature 1: Japanese Patent Application Laid-Open No. 2017-48852

SUMMARY OF INVENTION

Technical Problem

As described above, in the speed reducer described in Patent Literature 1, both ends of the shaft of the inner pin are fixed to the hub and the output shaft pin holder with the fixing bolts. Thus, it is necessary to form holes in an end portion of the shaft of the inner pin such that the fixing bolts are inserted in the holes. In this case, it is difficult to reduce the size of the shaft of the inner pin, and thus, size reduction of the speed reducer in the radial directions becomes difficult. Accordingly, the conventional speed reducer has room for improvement for size reduction.

It is therefore an object of the present disclosure to provide a speed reducer that can be made compact.

Solution to Problems

A speed reducer according to the present disclosure includes: a ring-shaped external gear including a plurality of outer teeth and having a plurality of through holes, the outer teeth being arranged on an outer circumferential surface of the external gear in circumferential directions, the through holes penetrating the external gear in axial directions and arranged in the circumferential directions; an input shaft penetrating space surrounded by an inner circumferential surface of the external gear and extending in the axial directions; a bearing disposed between the external gear and the input shaft and holding the input shaft such that the input shaft is rotatable relative to the external gear in the circumferential directions; a ring-shaped internal gear including a plurality of inner teeth and surrounding the outer circumferential surface of the external gear, the inner teeth being arranged on an inner circumferential surface of the internal gear and meshing with the outer teeth; a plurality of inner pins penetrating the through holes in the axial directions; and an inner pin holder holding both ends of each of the inner pins and having space, the input shaft penetrating the space. The inner pin holder includes a first holder portion including a ring-shaped holding portion holding a first end of each of the inner pins, a second holder portion including a ring-shaped holding portion holding a second end of each of the inner pins, the second end being opposite to the first end, and pillars connecting the first holder portion and the second holder portion to each other, arranged at intervals in the circumferential directions, and penetrating the through holes. The speed reducer further includes fixing members that fix end surfaces of the pillars to the first holder portion or the second holder portion and are inserted in the pillars from the end surfaces of the pillars.

Advantages of Invention

The present disclosure can provide a speed reducer that can be made compact.

DESCRIPTION OF EMBODIMENTS

Summary of Embodiment

Figure 1:
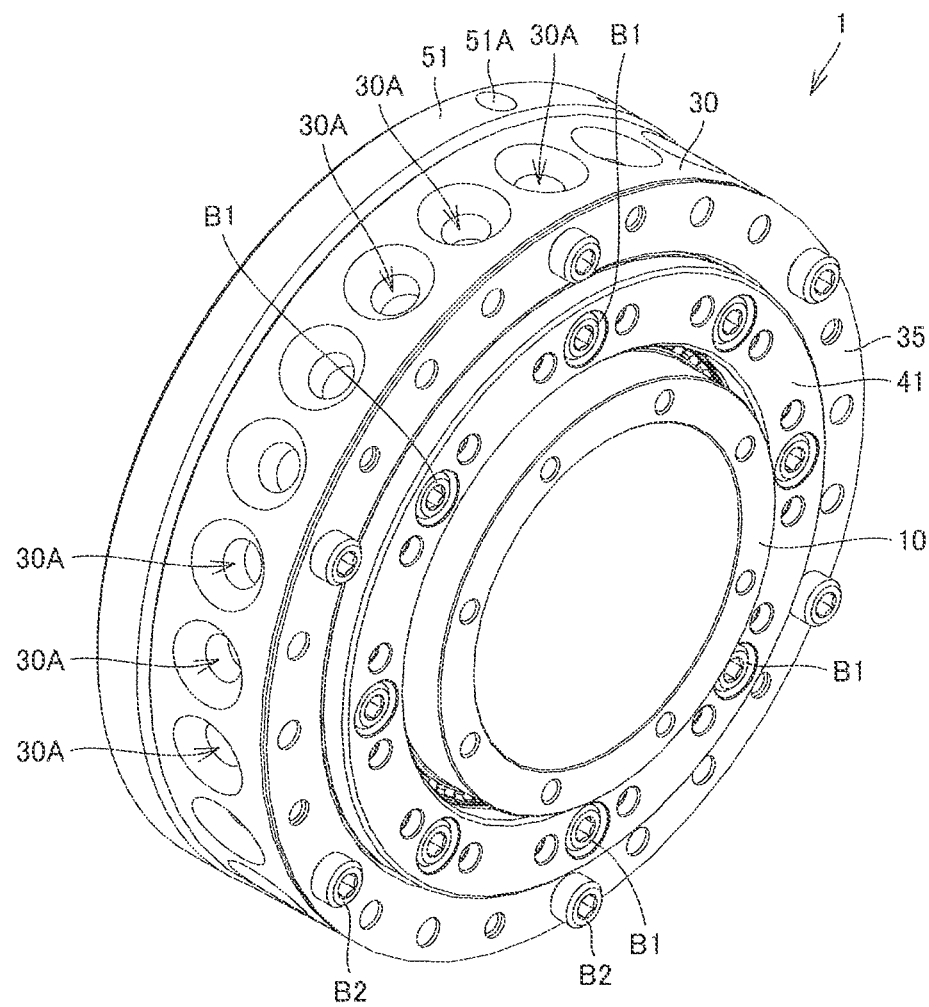
FIG. 1 is a perspective view illustrating an exterior configuration of a cycloid speed reducer according to a first embodiment.

A speed reducer according to the present disclosure includes: a ring-shaped external gear including a plurality of outer teeth and having a plurality of through holes, the outer teeth being arranged on an outer circumferential surface of the external gear in circumferential directions, the through holes penetrating the external gear in axial directions and arranged in the circumferential directions; an input shaft penetrating space surrounded by an inner circumferential surface of the external gear and extending in the axial directions; a bearing disposed between the external gear and the input shaft and holding the input shaft such that the input shaft is rotatable relative to the external gear in the circumferential directions; a ring-shaped internal gear including a plurality of inner teeth and surrounding the outer circumferential surface of the external gear, the inner teeth being arranged on an inner circumferential surface of the internal gear and meshing with the outer teeth; a plurality of inner pins penetrating the through holes in the axial directions; and an inner pin holder holding both ends of each of the inner pins and having space, the input shaft penetrating the space. The inner pin holder includes a first holder portion including a ring-shaped holding portion holding a first end of each of the inner pins, a second holder portion including a ring-shaped holding portion holding a second end of each of the inner pins, the second end being opposite to the first end, and pillars connecting the first holder portion and the second holder portion to each other, arranged at intervals in the circumferential directions, and penetrating the through holes. The speed reducer further includes fixing members that fix end surfaces of the pillars to the first holder portion or the second holder portion and are inserted in the pillars from the end surfaces of the pillars.

In the speed reducer, the fixing members inserted in the pillars from end surfaces of the pillars fix the end surfaces to the first holder portion or the second holder portion. Thus, unlike conventional speed reducers, the fixing members do not need to be inserted in the shafts of the inner pins. Accordingly, as compared to conventional speed reducers, in the speed reducer, the size of the inner pins can be reduced so that the speed reducer can be reduced in size in the radial directions and thereby can be made compact.

In the speed reducer, a cross-sectional shape of each of the pillars perpendicular to longitudinal directions may be an arc shape extending in the circumferential directions. The through holes may be elongated holes extending in the circumferential directions. With this configuration, the area of the end surfaces of the pillars can be increased so that constraint of the position of insertion holes for the fixing members can be thereby reduced. As a result, flexibility in design of the speed reducer can be enhanced.

In the speed reducer, the inner pins may sandwich a corresponding one of the pillars in the circumferential directions. The inner pins may be rolling bearings or plain bearings. This configuration can suppress direct contact of both ends of each pillar in the circumferential directions with the inner surface of the through hole of the external gear. Thus, friction between these ends and the inner surface of the through hole can be reduced. In addition, the inner pins serving as rolling bearings or plain bearings rotate by contact with the inner surfaces of the through holes, and thus, an increase in a rotation torque of the input shaft can be suppressed.

The speed reducer may further include lubricating members disposed inside the through holes and contacting the inner pins. In this configuration, the inner pins are lubricated, and thus, friction between the outer circumferential surfaces of the inner pins and the inner surfaces of the through holes of the external gear can be reduced. This can reduce a loss caused by the friction so that an increase in rotation torque of the input shaft can be suppressed.

In the speed reducer, each of the lubricating members may include, in a cross section taken in a plane perpendicular to the axial directions, a base portion extending in the radial directions, a first projection projecting from a first end of the base portion, a second projection projecting from a second end of the base portion, the second end being opposite to the first end, and a third projection projecting from a portion of the base portion between the first end and the second end. Each of the lubricating members may be swingable to achieve a first contact state in which the first projection and the third projection contact the inner pin and the second projection is separated from the inner pin and a second contact state in which the second projection and the third projection contact the inner pin and the first projection is separated from the inner pin. With this configuration, the lubricating member can be brought into contact with the inner pins in the first through third projections. Accordingly, as compared to a case where the entire surface of the lubricating member is in contact with the inner pins, a torque loss and a temperature rise can be suppressed.

In the speed reducer, the pillars may have grooves in which the lubricating members are housed. An outer shape of the grooves in a cross section perpendicular to longitudinal directions may correspond to the lubricating members. With this configuration, the lubricating members can swing smoothly in the grooves of the pillars.

Specific Examples of Embodiment

Next, an embodiment of a speed reducer according to the present disclosure will be described with reference to the drawings. In the following drawings, the same or corresponding parts are denoted by the same reference numerals, and the description thereof will not be repeated.

First Embodiment

Figure 2:
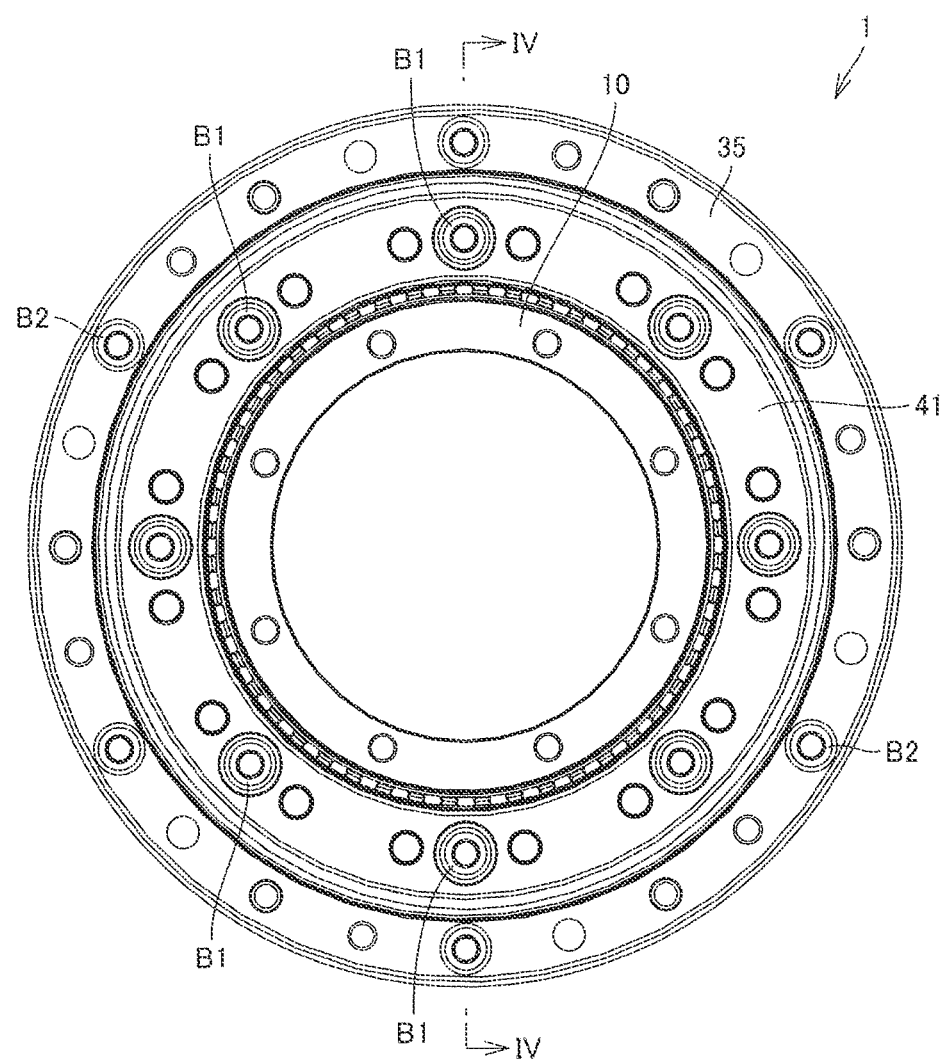
FIG. 2 is a front view of the cycloid speed reducer according to the first embodiment seen from an input side.
Figure 3:
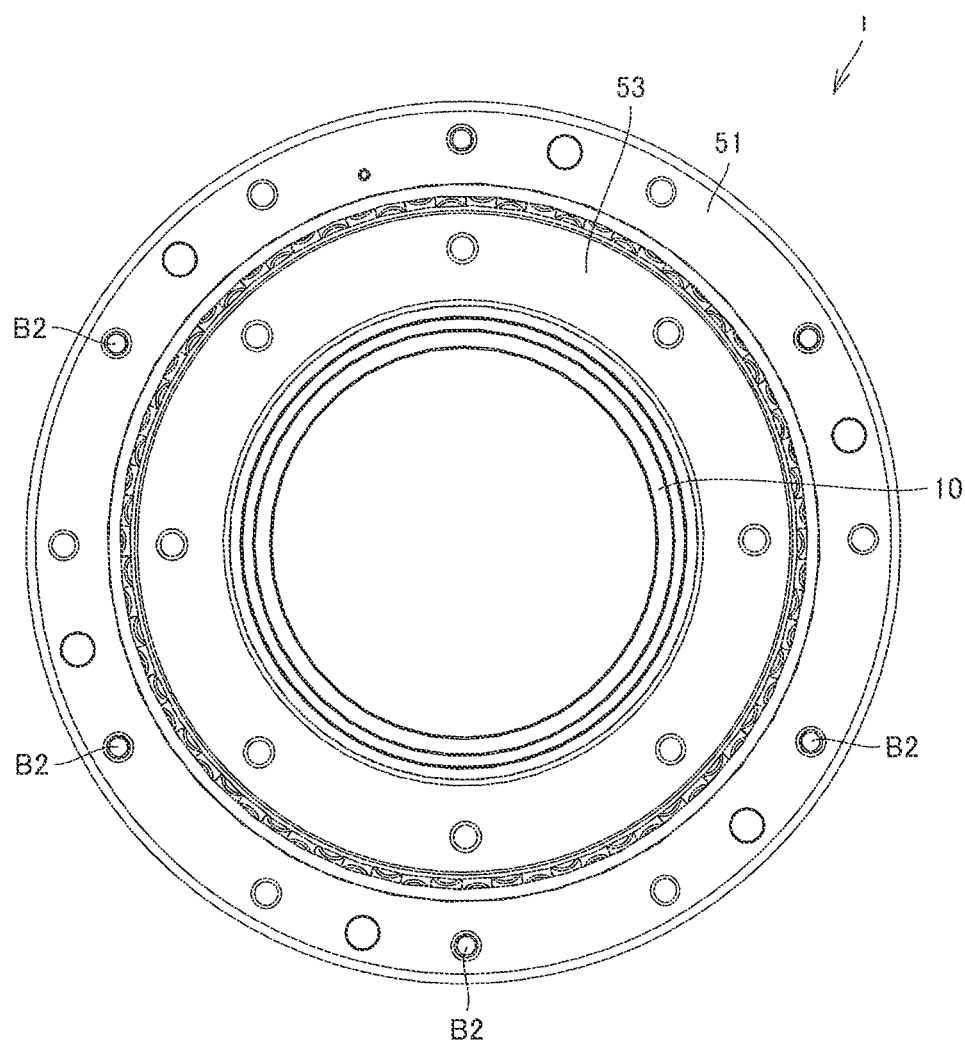
FIG. 3 is a rear view of the cycloid speed reducer according to the first embodiment seen from an output shaft.
Figure 4:
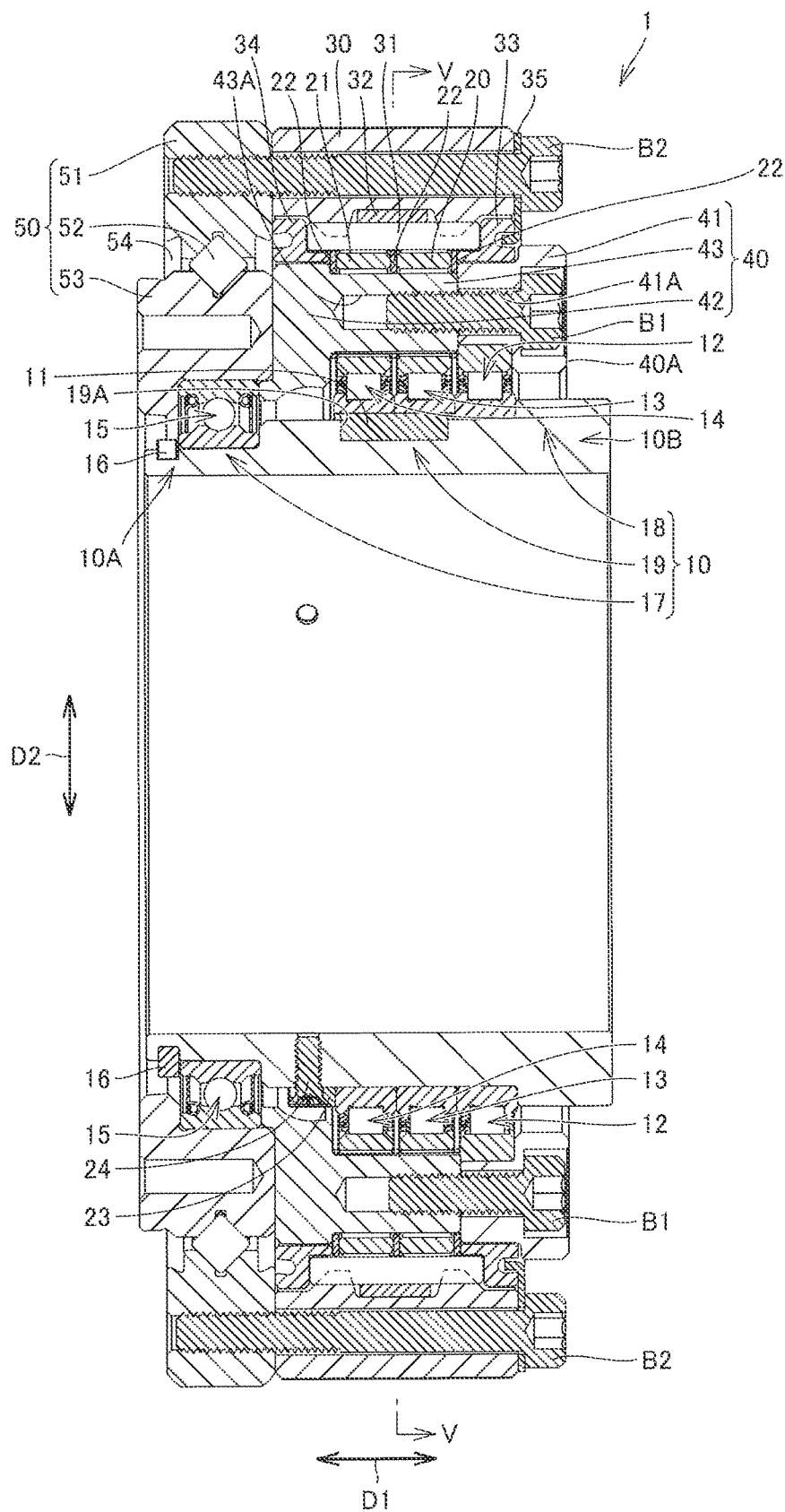
FIG. 4 is a cross-sectional view taken along line IV-IV in FIG. 2.
Figure 5:
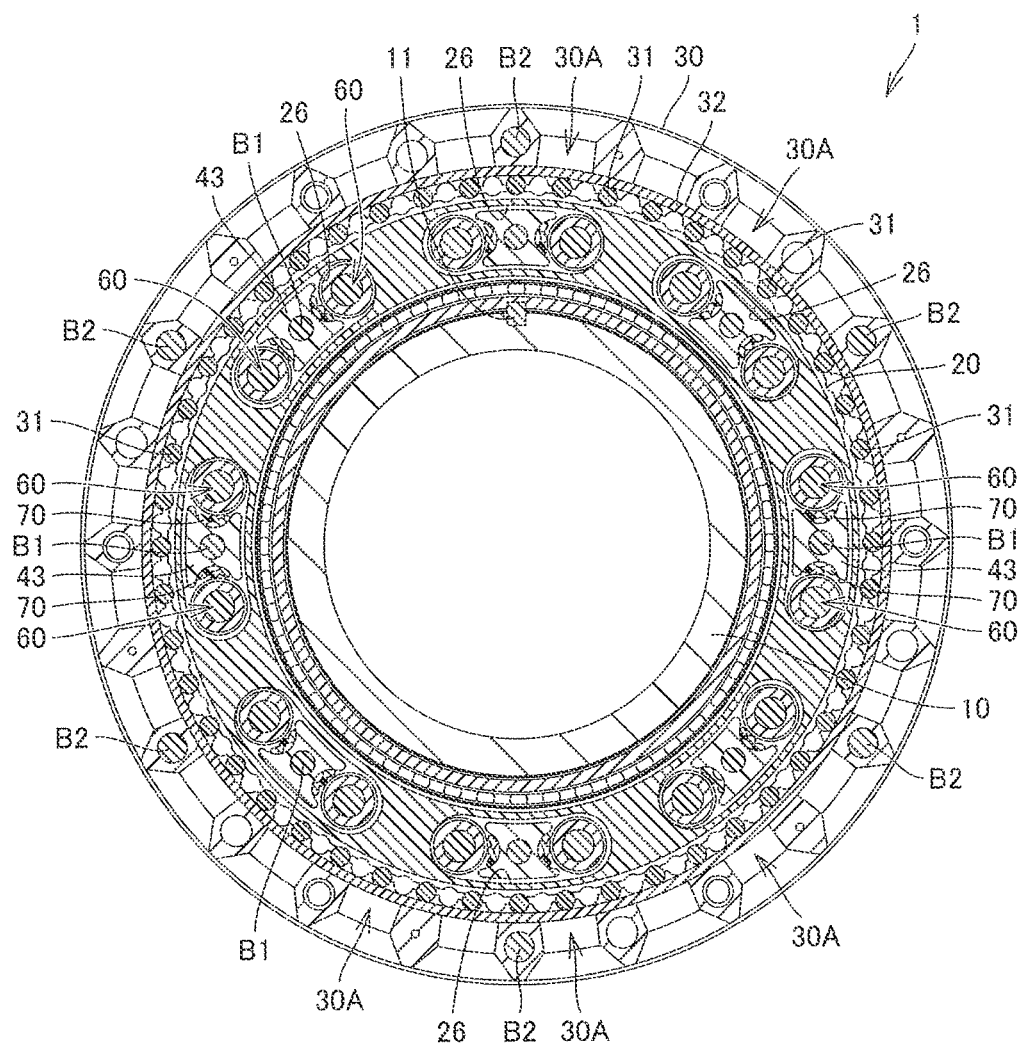
FIG. 5 is a cross-sectional view taken along line V-V in FIG. 4.

First, a configuration of a cycloid speed reducer 1 (hereinafter referred to simply as a "speed reducer 1") according to a first embodiment will be described. The speed reducer 1 is used for, for example, a joint of a robot or a control unit for driving a wheel in a mobile device. FIG. 1 is a perspective view illustrating an exterior configuration of the speed reducer 1. FIG. 2 is a front view of the speed reducer 1 seen from an input shaft 10. FIG. 3 is a rear view of the speed reducer 1 seen from an output shaft 53. FIG. 4 is a cross-sectional view taken along line IV-IV in FIG. 2. FIG. 5 is a cross-sectional view taken along line V-V in FIG. 4. As illustrated in FIG. 4, the speed reducer 1 mainly includes the input shaft 10, first and second external gears 20 and 21 (external gears), first and second eccentric bearings 13 and 14 (bearings), a plurality of outer pins 31 and an outer pin holder 30 (internal gear), an inner pin holder 40, and a main bearing 50. These components will be hereinafter individually described in detail. In this embodiment, a lubricant such as grease is previously enclosed in the bearings and other members.

The input shaft 10 has a hollow cylindrical shape and extends in axial directions D1. As illustrated in FIG. 4, the input shaft 10 includes a first end 10A, and a second end 10B located at the opposite side to the first end 10A in the axial directions D1. The second end 10B is at an end opposite to the output shaft 53, and projects outward in the axial directions D1 from an end surface 40A of the inner pin holder 40. A driving motor (not shown) is attached to the second end 10B, and the input shaft 10 rotates about the axis by driving the motor. The input shaft is not limited to a hollow shaft and may be a solid shaft.

The input shaft 10 includes a first shaft portion 17 including the first end 10A, a second shaft portion 18 including the second end 10B, and a third shaft portion 19 connecting the first shaft portion 17 and the second shaft portion 18 to each other. The outer diameter of the third shaft portion 19 is larger than the outer diameter of the first shaft portion 17. The outer diameter of the second shaft portion 18 is larger than the outer diameter of the third shaft portion 19. That is, the outer diameter of the input shaft 10 increases stepwise from the first end 10A toward the second end 10B. On the other hand, the first through third shaft portions 17 through 19 have the same inner diameter.

As illustrated in FIG. 4, the third shaft portion 19 is inserted in inner rings of the first support bearing 12, the first eccentric bearing 13, and the second eccentric bearing 14. The first shaft portion 17 is inserted in an inner ring of the second support bearing 15. Both ends of the input shaft 10 are supported by the first support bearing 12 and the second support bearing 15. The first eccentric bearing 13 is disposed between the first external gear 20 and the input shaft 10 (third shaft portion 19), and holds the input shaft 10 such that the input shaft 10 is rotatable circumferentially relative to the first external gear 20. The second eccentric bearing 14 is disposed between the second external gear 21 and the input shaft 10 (third shaft portion 19), and holds the input shaft 10 such that the input shaft 10 is rotatable circumferentially relative to the second external gear 21. A keyway 19A in which a key 11 is to be inserted is formed on an outer circumferential surface of the third shaft portion 19 and extends in the axial directions D1. The key 11 fixes the inner rings of the first eccentric bearing 13 and the second eccentric bearing 14 to the input shaft 10.

As illustrated in FIG. 4, the first support bearing 12, the first eccentric bearing 13, and the second eccentric bearing 14 are arranged in this order from the second end 10B toward the first end 10A, and the inner rings thereof are sandwiched in the axial directions D1 by a step end surface between the second shaft portion 18 and the third shaft portion 19 and retaining members 23. The retaining members 23 are attached to the outer circumferential surface of the input shaft 10 (third shaft portion 19) with a fixing screw 24. The plurality of (three in this embodiment) retaining members 23 are arranged at intervals in the circumferential directions of the input shaft 10.

An annular recessed groove in which a retaining ring 16 is disposed is formed on the outer circumferential surface of the first shaft portion 17. As illustrated in FIG. 4, the inner ring of the second support bearing 15 is sandwiched in the axial directions D1 by a step end surface between the first shaft portion 17 and the third shaft portion 19 and the retaining ring 16.

Figure 6:
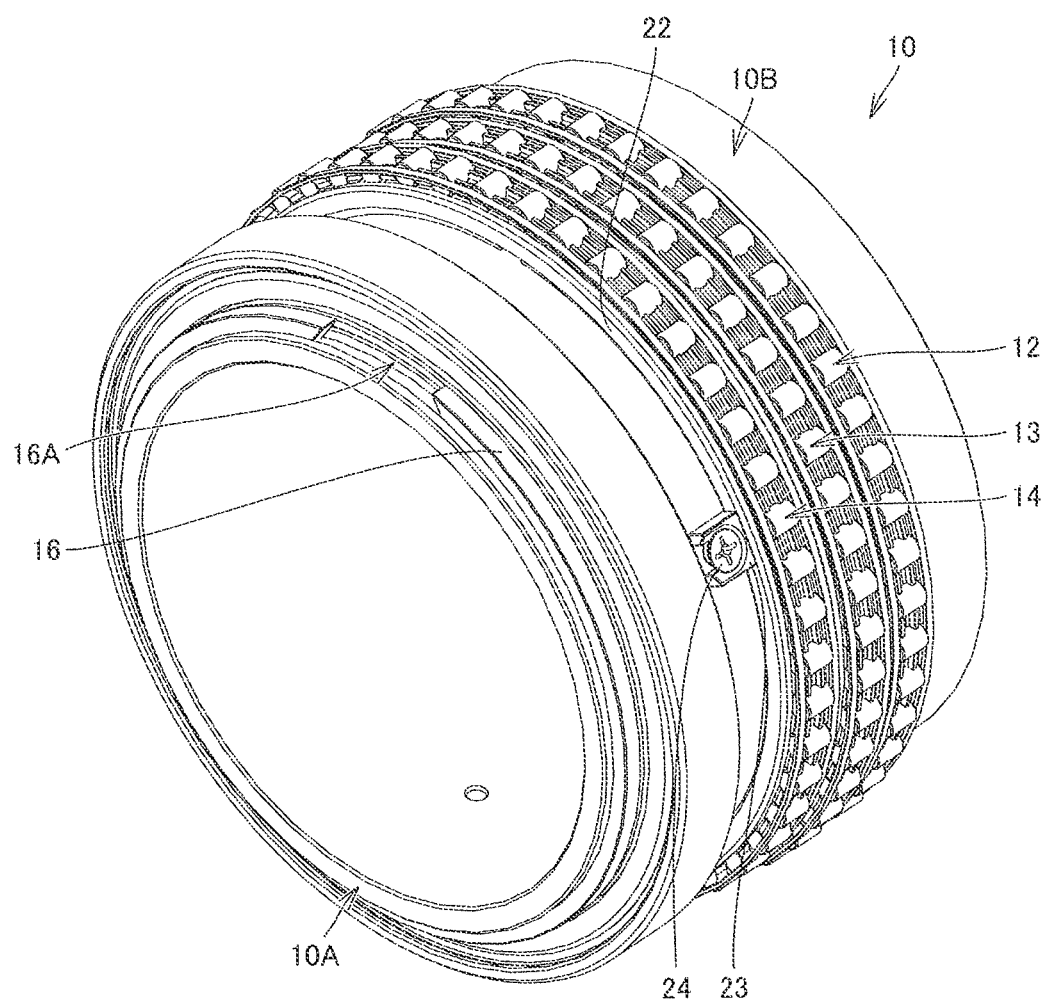
FIG. 6 is a perspective view illustrating a configuration of an input shaft.
Figure 7:
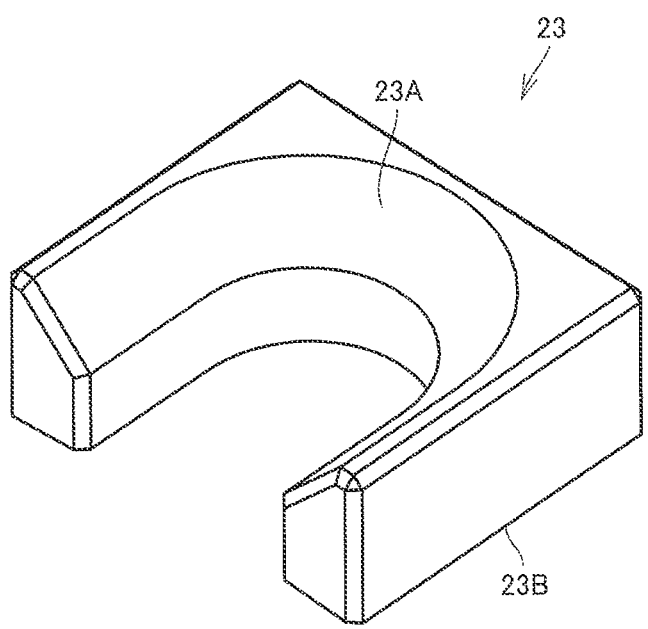
FIG. 7 is a perspective view illustrating a configuration of a retaining member.

FIG. 6 is a perspective view illustrating a configuration of the input shaft 10 inserted in the bearings. FIG. 7 is a perspective view illustrating a configuration of the retaining member 23. As illustrated in FIG. 6, the retaining ring 16 is a circular ring-shaped (C-shaped) member in which a notch 16A is formed in a portion of the retaining ring 16 in the circumferential directions. As illustrated in FIG. 7, the retaining member 23 is open in a U shape such that a fixing screw can be inserted in the retaining member 23. In the retaining member 23, an upper surface 23A is a slope (surface tilted relative to a plane perpendicular to the thickness direction of the retaining member 23) and a lower surface 23B is curved along the outer circumferential surface of the input shaft 10.

The first support bearing 12, the first eccentric bearing 13 and the second eccentric bearing 14 are, for example, cylindrical roller bearings. The first eccentric bearing 13 and the second eccentric bearing 14 are fixed to the input shaft 10 with eccentric phases thereof shifted from each other by 180°. Each of the first eccentric bearing 13 and the second eccentric bearing 14 includes an eccentric inner ring, a cylindrical roller (roller), a cylindrical outer ring, and a cage. As the cage, a lightweight resin cage can be employed, but the present disclosure is not limited this example. For example, a metal cage may be employed in the first eccentric bearing 13 and the second eccentric bearing 14.

As illustrated in FIG. 4, the inner ring of each of the first eccentric bearing 13 and the second eccentric bearing 14 includes a pair of flanges that restricts movement of the cylindrical roller in the axial directions D1. The inner ring is fixed to the outer circumferential surface of the input shaft 10 by the key 11 so that rotation of the inner ring to the input shaft 10 is prevented. In this embodiment, no seal is provided in the first support bearing 12, but the present disclosure is not limited to this example, and a seal may be provided. The second support bearing 15 is, but not limited to, a deep groove ball bearing with a seal, for example. Alternatively, a bearing with no seal may be employed.

The first external gear 20 and the second external gear 21 are cycloid gears. The first external gear 20 is fitted onto the outer ring of the first eccentric bearing 13 from the outer side in the radial directions D2. The second external gear 21 is fitted onto the outer ring of the second eccentric bearing 14 from the outer side in the radial directions D2.

Figure 8:
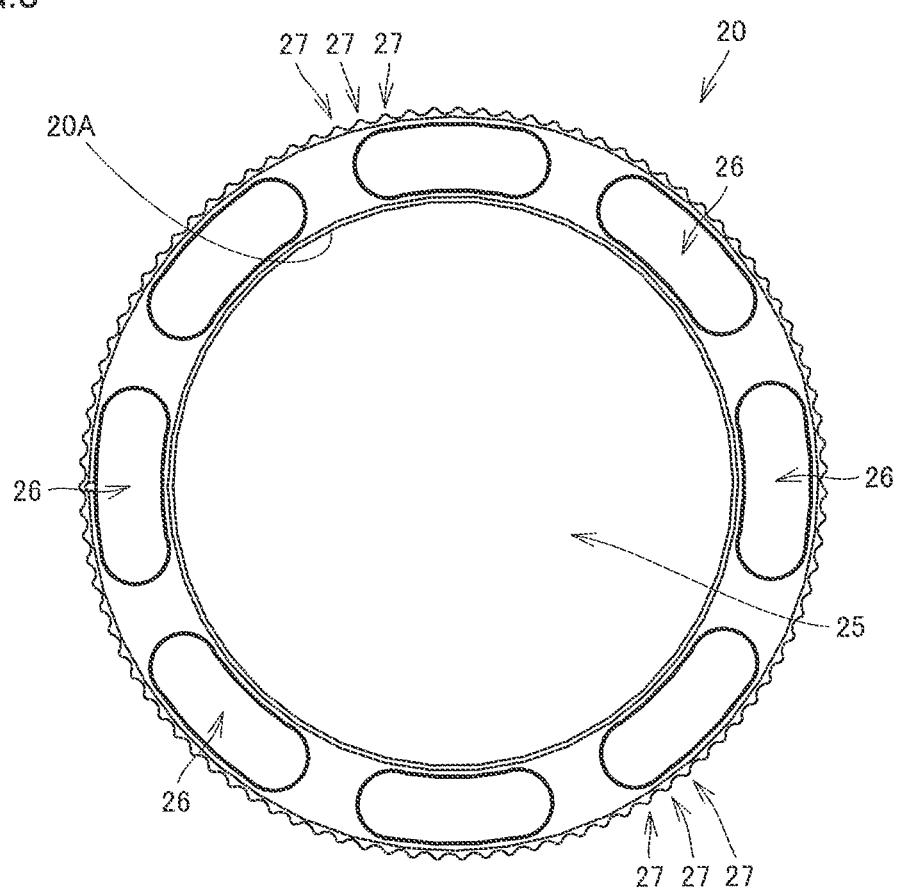
FIG. 8 is a plan view illustrating a configuration of a cycloid gear.

FIG. 8 is a plan view of the first external gear 20. As illustrated in FIG. 8, the first external gear 20 is a ring-shaped member including a plurality of outer teeth 27 arranged on the outer circumferential surface circumferentially and having a plurality of elongated holes 26 (through holes) penetrating the ring-shaped member in the axial directions and arranged circumferentially. The first external gear 20 includes a center hole 25 (space) surrounded by the inner circumferential surface 20A, and the input shaft 10 (FIG. 4) penetrates the center hole 25.

The plurality of (eight in this embodiment) elongated holes 26 extend circumferentially and surround the center hole 25. The center hole 25 is a circular hole. The outer ring of the first eccentric bearing 13 (FIG. 4) may be omitted so that the inner circumferential surface 20A serves as a raceway surface of the cylindrical roller. The outer teeth 27 in this embodiment have, but not limited to, an epitrochoid parallel curve. The number of the outer teeth 27 is not particularly limited, and can be selected as needed in order to obtain a desired deceleration rate.

The first external gear 20 is made of, but not limited to, a steel member such as high-carbon chromium bearing steel (SUJ2) or chromium molybdenum steel (SCM) in conformity with Japanese Industrial Standards (JIS) and subjected to heat treatment, for example. For example, aluminum or a resin material such as carbon fiber reinforced plastic (CFRP) may be employed as a material for the first external gear 20. The second external gear 21 is basically the same as the first external gear 20, and thus, will not be described in detail.

The outer pins 31 (FIG. 4) have columnar shapes extending in the axial directions D1, and constitute inner teeth meshing with the outer teeth 27 (FIG. 8). The outer pins 31 are held by the inner circumferential surface of the outer pin holder 30 and arranged circumferentially on the inner circumferential surface. The number of the outer pins 31 is, but not limited to, larger than the number of the outer teeth 27 by one in this embodiment.

Figure 9:
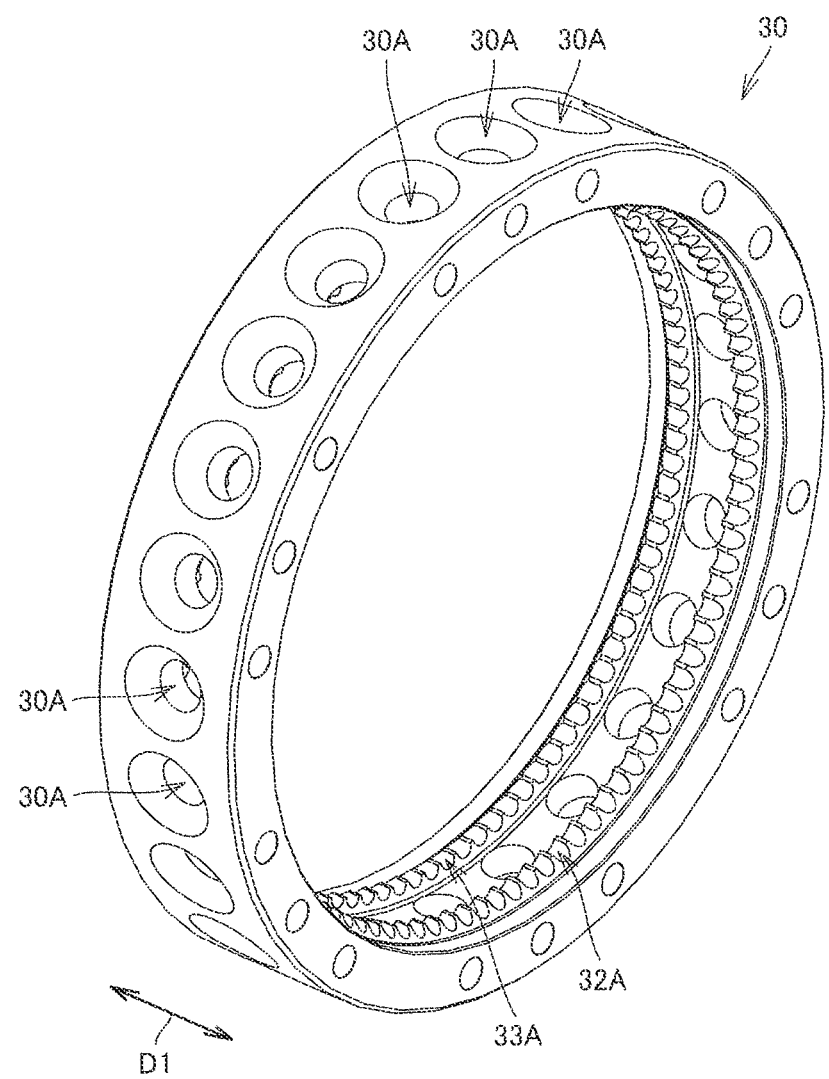
FIG. 9 is a perspective view illustrating a configuration of an outer pin holder

FIG. 9 is a perspective view illustrating a configuration of the outer pin holder 30. The outer pin holder 30 is a ring-shaped member surrounding the outer circumferential surfaces of the first external gear 20 and the second external gear 21 (FIG. 4). The outer pin holder 30 includes a plurality of through holes 30A penetrating the outer pin holder 30 from the outer circumferential surface to the inner circumferential surface and arranged over the entire circumferential directions. The through holes 30A are formed to reduce the weight of the outer pin holder 30, and the inner diameter of each of the through holes 30A gradually decreases inward in the radial directions. The shape and number of the through holes 30A are not particularly limited. The through holes 30A are not necessary elements for the speed reducer according to the present disclosure, and may be omitted.

As illustrated in FIG. 9, the inner circumferential surface of the outer pin holder 30 is provided with a first pin retention ring 32A, and a second pin retention ring 33A separated from the first pin retention ring 32A in the axial directions D1. Each of the first pin retention ring 32A and the second pin retention ring 33A includes a plurality of arc-shaped grooves arranged circumferentially and each extending in the axial directions D1, and has an annular shape along the inner circumferential surface of the outer pin holder 30. In the outer pins 31 (FIG. 4), first ends are fitted in the grooves of the first pin retention ring 32A and second ends opposite to the first ends in the axial directions D1 are fitted in the grooves of the second pin retention ring 33A. Accordingly, the plurality of outer pins 31 and the outer pin holder 30 constitute a ring-shaped internal gear that includes a plurality of inner teeth arranged circumferentially on the inner circumferential surface and meshing with the outer teeth 27 (FIG. 8) and surrounds the outer circumferential surfaces of the first external gear 20 and the second external gear 21. In this embodiment, the outer pins 31 are arranged for, but not limited to, every other one of the grooves of the first pin retention ring 32A and the second pin retention ring 33A.

As illustrated in FIG. 4, the input shaft 10, the first external gear 20, the second external gear 21, and the inner pin holder 40 are housed inside the outer pin holder 30 in the radial directions D2. The speed reducer 1 includes a first pin restriction member 33 and a second pin restriction member 34 that restrict movement of the outer pins 31 in the axial directions D1. The first pin restriction member 33 is a ring-shaped member and opposed to first end surfaces (right end surfaces in FIG. 4) of the outer pins 31 in the axial directions D1. The second pin restriction member 34 is a ring-shaped member similar to the first pin restriction member 33, and opposed to second end surfaces (left end surfaces in FIG. 4) of the outer pins 31 in the axial directions D1.

The speed reducer 1 includes a dustproof external plate 35 fixed to a first end surface (end surface opposite to the main bearing 50, right end surface in FIG. 4) of the outer pin holder 30 with bolts B2. As illustrated in FIG. 4, the external plate 35 extends inward of the inner circumferential surface of the outer pin holder 30 in the radial directions D2 to cover a gap between the outer pin holder 30 and the inner pin holder 40 in the radial directions D2. In the speed reducer according to the present disclosure, the first pin restriction member 33, the second pin restriction member 34, and the external plate 35 are not necessary elements, and may be omitted.

The speed reducer 1 includes an outer pin lubricating member 32. The outer pin lubricating member 32 is a ring-shaped member in which a porous sintered resin member is impregnated with a lubricant, for example. The outer pin lubricating member 32 is disposed at the inner circumferential surface of the outer pin holder 30 (FIG. 4). More specifically, the outer pin lubricating member 32 is disposed at a portion of the inner circumferential surface of the outer pin holder 30 between the first pin retention ring 32A and the second pin retention ring 33A (FIG. 9).

The outer pins 31 rotates about the axis by contact with the first external gear 20 and the second external gear 21. The outer pins 31 contact the outer pin lubricating member 32. Thus, with rotation of the outer pins 31 about the axis, the outer pin lubricating member 32 also rotates about the axis (about the rotation axis of the speed reducer 1). Since the lubricant can be supplied to the outer pins 31 by the outer pin lubricating member 32, friction between the outer pins 31 and the first and second external gears 20 and 21 can be reduced. Accordingly, a loss caused by the friction can be reduced, and an increase in rotation torque of the input shaft 10 can be suppressed. The outer pin lubricating member 32 is not a necessary element in the speed reducer according to the present disclosure, and may be omitted.

Figure 10:
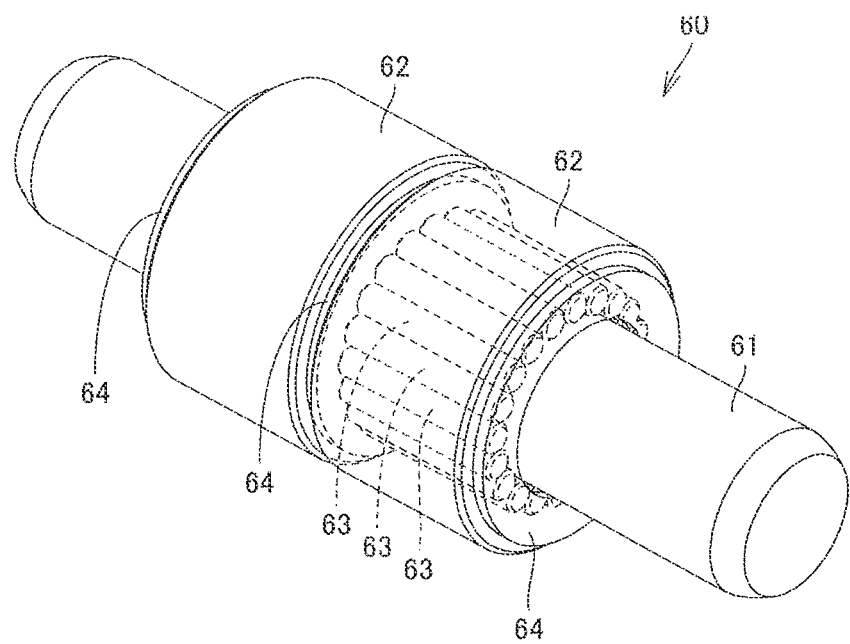
FIG. 10 is a perspective view illustrating a configuration of inner pins.

The speed reducer 1 includes a plurality of (16 in this embodiment) inner pins 60 penetrating a plurality of elongated holes 26 in the first external gear 20 and the second external gear 21 along the axial directions D1 (FIG. 5). FIG. 10 is a perspective view illustrating a configuration of the inner pins 60 in this embodiment, and shows rollers 63 by broken lines. As illustrated in FIG. 10, each of the inner pins 60 is a rolling bearing including a columnar shaft 61, a pair of ring-shaped outer rings 62, and a plurality of rollers 63 (needle rollers). The inner pin is not limited to the rolling bearing as described in this embodiment, and may be, for example, a plain bearing.

As illustrated in FIG. 10, the shaft 61 has its corners at both ends chamfered and is inserted in the inside of each of the pair of the outer rings 62. The rollers 63 are disposed in a ring shape between the outer circumferential surface of the shaft 61 and the inner circumferential surfaces of the outer rings 62. Each inner pin 60 includes thrust washers 64 located at outer end surfaces of the outer rings 62 and between the outer rings 62. The thrust washers 64 are made of, but not limited to, a thermoplastic resin such as polyether ether ketone (PEEK).

The inner pin holder 40 (FIG. 4) holds both ends of the inner pins 60. The inner pin holder 40 has space through which the input shaft 10 passes. As illustrated in FIG. 4, the inner pin holder 40 includes the first holder portion 41, a second holder portion 42, and pillars 43. Thrust washers 22 are disposed between the first external gear 20 and the first holder portion 41, between the first external gear 20 and the second external gear 21, and between the second external gear 21 and the second holder portion 42. The thrust washers 22 are made of, for example, a thermoplastic resin such as PEEK. Accordingly, abrasion caused by contact between the external gear and the inner pin holder 40 and abrasion caused by contact between the external gears are suppressed, and heat generation can be prevented. The thrust washers are not necessary elements for the speed reducer according to the present disclosure, and may be omitted.

Figure 11:
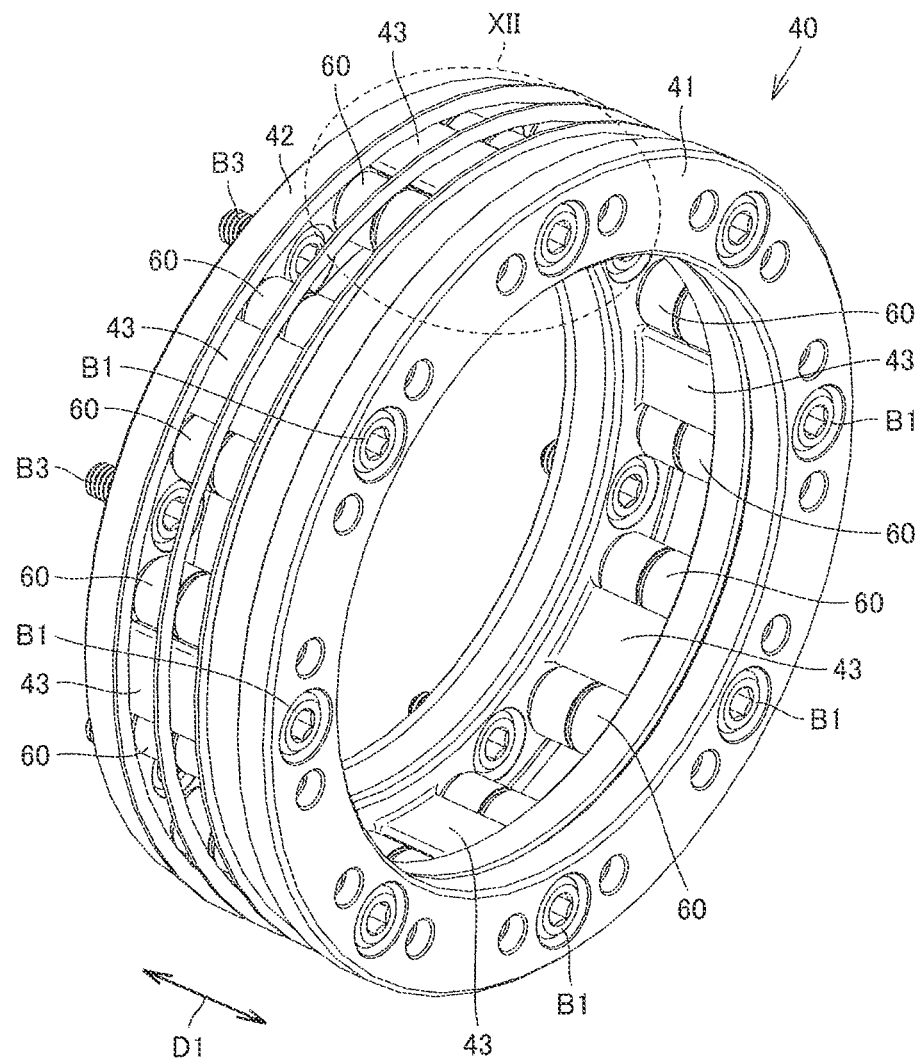
FIG. 11 is a perspective view illustrating a basket structure in which the inner pins are held in an inner pin holder.

FIG. 11 is a perspective view illustrating a basket structure in which both ends of the inner pins 60 in the axial directions D1 are held by the inner pin holder 40. FIG. 11 does not show the input shaft 10, the first external gear 20, and the second external gear 21. As illustrated in FIG. 11, the first holder portion 41 includes a ring-shaped holding portion holding the first ends of the inner pins 60.

Figure 12:
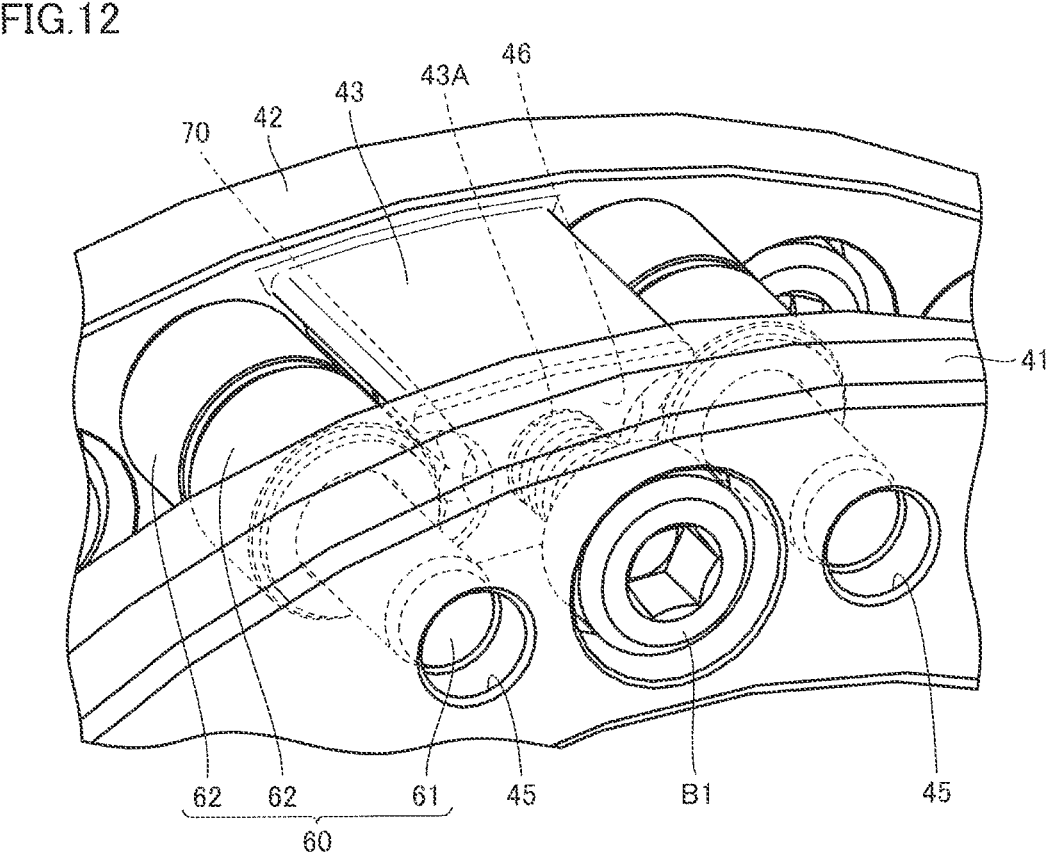
FIG. 12 is an enlarged view of a region XII in FIG. 11.

FIG. 12 is an enlarged view of a region XII in FIG. 11. As illustrated in FIG. 12, in the first holder portion 41, holes 45 in which a first end of the shaft 61 is press fitted are formed at intervals circumferentially. The holes 45 penetrate the first holder portion 41 in the thickness directions. To retain the shaft 61, a reamer process is performed only on a portion of the holes 45 in which the shaft 61 is press fitted.

The second holder portion 42 includes a ring-shaped holding portion that holds the second ends of the inner pins 60 opposite to the first ends thereof. As illustrated in FIG. 11, the second holder portion 42 is a ring-shaped portion having a diameter approximately equal to that of the first holder portion 41, and is separated from the first holder portion 41 in the axial directions D1. In a manner similar to the first holder portion 41, in the second holder portion 42, holes in which the second ends of the inner pins 60 are press fitted are formed at intervals circumferentially.

The pillars 43 connect the first holder portion 41 and the second holder portion 42 to each other and are arranged at intervals circumferentially (FIG. 11). The pillars 43 penetrate the elongated holes 26 formed in the first external gear 20 and the second external gear 21, together with the inner pins 60 (FIG. 5). The number of the pillars 43 is, but not limited to, a half of the number of the inner pins 60, and is preferably four for more.

Figure 13:
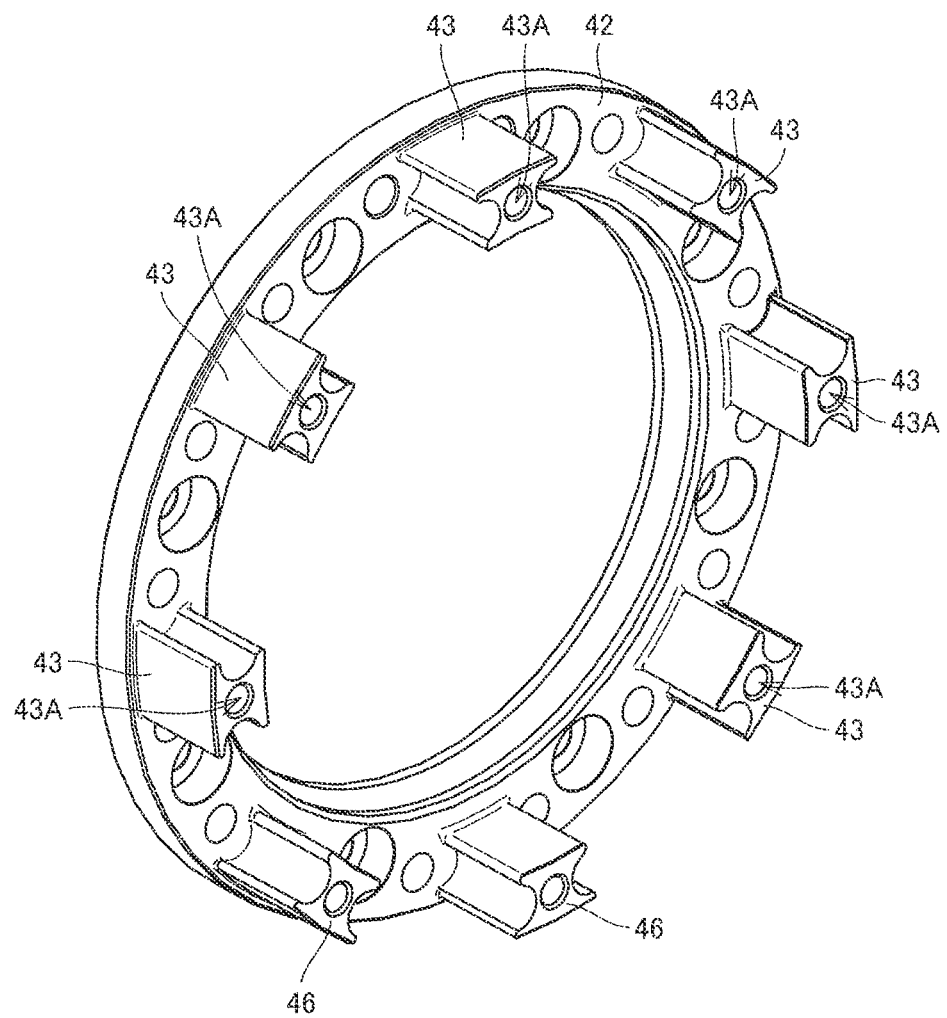
FIG. 13 is a perspective view illustrating a configuration of a second holder portion and pillars.

FIG. 13 illustrates a state in which the first holder portion 41 is detached in the inner pin holder 40. As illustrated in FIG. 13, each of the pillars 43 has an arc shape whose cross-sectional shape perpendicular to the longitudinal directions (axial directions D1) extends circumferentially. In this embodiment, the second holder portion 42 and the pillars 43 are integrated. Each of the pillars 43 includes an end surface 46 at the side opposite to the second holder portion 42. The end surface 46 is fixed to the first holder portion 41 (FIG. 12). The second holder portion 42 and the pillars 43 are not necessarily integrated, and the first holder portion 41, the second holder portion 42, and the pillars 43 may be separate members.

The speed reducer 1 includes a plurality of bolts B1 (fixing members) that fix the end surfaces 46 of the pillars 43 to the first holder portion 41 and are inserted in the pillars 43 from the end surfaces 46 (FIGS. 11 and 12). As illustrated in FIG. 4, the first holder portion 41 includes bolt holes 41A (through holes) in which the bolts B1 are inserted. On the other hand, the pillars 43 include female threads 43A with which male threads formed on the outer circumferential surfaces of the shaft portions of the bolts B1 mesh. The female threads 43A are bottomed holes that are open toward the first holder portion 41 and are formed in association with the bolt holes 41A.

As illustrated in FIG. 5, each of the pillars 43 is inserted in a corresponding one of the elongated holes 26 together with a pair of inner pins 60. More specifically, the plurality of (two) inner pins 60 are disposed to sandwich a corresponding one of the pillars 43 in the circumferential directions. The inner pins 60 are in contact with the inner surfaces of the elongated holes 26.

The speed reducer 1 includes inner pin lubricating members 70 for lubricating the inner pins 60 (FIG. 5). The inner pin lubricating members 70 are disposed inside the elongated holes 26, and contact the outer circumferential surfaces of the inner pins 60 (outer circumferential surfaces of the outer rings 62). More specifically, as illustrated in FIG. 5, grooves each extending in the axial directions and having an arc shape in a cross section perpendicular to the axial directions are formed at both sides of each of the pillars 43 in the circumferential directions. The inner pin lubricating members 70 are housed in the grooves. The outer shapes of the grooves in a cross section (cross section in FIG. 5) perpendicular to the longitudinal directions correspond to the inner pin lubricating members 70. The inner pin lubricating members 70 are obtained by, but not limited to, impregnating a porous sintered resin member with a lubricant, for example.

Figure 14:
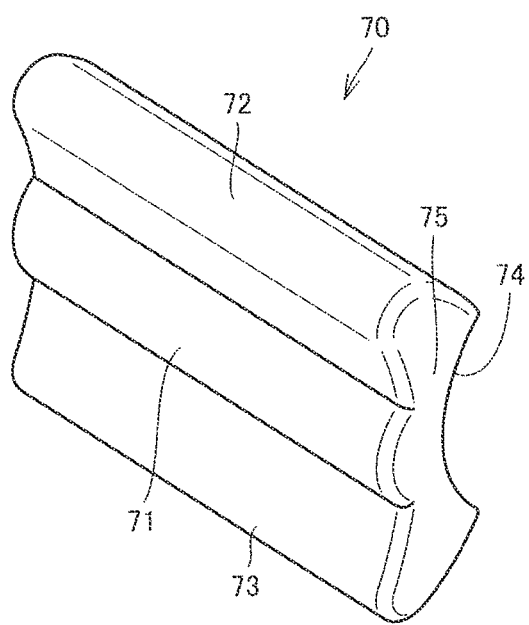
FIG. 14 is a perspective view illustrating a configuration of an inner pin lubricating member.

FIG. 14 is a perspective view illustrating a configuration of each inner pin lubricating member 70. With reference to FIGS. 5 and 14, in a cross section (cross section in FIG. 5) taken in a plane perpendicular to the axial directions D1, each of the inner pin lubricating members 70 includes a base portion 75 extending in the radial directions D2, a first projection 72, a second projection 73, and a third projection 71. The first projection 72 projects from a first end of the base portion 75. The second projection 73 projects from a second end of the base portion 75 opposite to the first end in the radial directions D2. The third projection 71 projects from a portion of the base portion 75 between the first end and the second end.

Each of the first through third projections projects toward the outer circumferential surface of the inner pin 60 and has a curved tip. That is, each of the inner pin lubricating members 70 is oriented with the tips of the first through third projections facing the outer circumferential surface of the inner pin 60. A back surface 74 (FIG. 14) of each inner pin lubricating member 70 at the side opposite to the first through third projections is curved in an arc shape recessed in a direction away from the pillar 43 (FIG. 5). Thus, when driving of the speed reducer 1 is stopped, a gap is formed between a side of the pillars 43 in the circumferential directions and the inner pin lubricating member 70.

To achieve a first contact state in which the first projection 72 and the third projection 71 are in contact with the outer circumferential surface of the inner pin 60 and the second projection 73 is separated from the outer circumferential surface of the inner pin 60 and a second contact state in which the second projection 73 and the third projection 71 are in contact with the outer circumferential surface of the inner pin 60 and the first projection 72 is separated from the outer circumferential surfaces of the inner pin 60, the inner pin lubricating members 70 are swingable in the grooves formed at both sides of the pillar 43 in the circumferential directions. More specifically, the inner pin lubricating members 70 swing along the arc-shaped curves formed at both sides of the pillar 43 in the circumferential directions so that the first projection 72 and the second projection 73 are thereby alternately brought into contact with the outer circumferential surfaces of the inner pins 60. When the input shaft 10 rotates clockwise in FIG. 5, the inner pin lubricating members 70 are in the first contact state. At this time, the outer rings 62 (FIG. 10) of the inner pins 60 rotate counterclockwise in FIG. 5. On the other hand, when the input shaft 10 rotates counterclockwise in FIG. 5, the inner pin lubricating members 70 are in the second contact state. At this time, the outer rings 62 of the inner pins 60 rotate clockwise in FIG. 5.

When the entire surfaces of the inner pin lubricating members 70 contact the outer rings 62 serving as the outer circumferential surfaces of the inner pins 60, the inner pin lubricating members 70 stick to the outer rings 62. Consequently, a torque loss and/or a temperature rise can occur. On the other hand, when the configuration in which the first through third projections contact the outer rings 62 of the inner pins 60 is employed, occurrence of problems as described above can be prevented. The inner pin lubricating members 70 are not necessary elements in the speed reducer according to the present disclosure, and may be omitted.

The main bearing 50 (FIG. 4) is, for example, a cloth roller bearing. As illustrated in FIG. 4, the main bearing 50 includes an outer ring 51, an inner ring 53, a plurality of rollers 52 arranged in an annular shape between a raceway surface (inner circumferential surface) of the outer ring 51 and a raceway surface (outer circumferential surface) of the inner ring 53, and a seal 54.

The outer ring 51 is fixed to a second end surface (end surface opposite to the first end surface; left end surface in FIG. 4) of the outer pin holder 30 with the bolts B2. The outer ring 51 constitutes a fixed shaft together with the outer pin holder 30. The outer ring 51 includes insertion holes for the rollers 52 and is provided with a lid 51A (FIG. 1) for covering the insertion holes. The lid 51A is retained with pins. The lid may be a side lid and is not limited to the case where the lid is provided in the outer ring 51. The lid is not limited to the case where the lid is retained with pins extending in the axial directions D1, and pins extending circumferentially or bolts may be employed.

The inner ring 53 is fixed to the surface of the second holder portion 42 opposite to the pillars 43 with bolts B3 (FIG. 11), and fitted onto the outer ring of the second support bearing 15 from the outer side in the radial directions D2. The inner ring 53 constitutes the outer shaft together with the inner pin holder 40, and is attached to a counterpart member (not shown).

The rollers 52 are cylindrical rollers, and rotation axes of the cylindrical rollers adjacent to each other in the circumferential directions are orthogonal to each other. Each of the outer ring 51 and the inner ring 53 is made of, but not limited to, a metal material such as high-carbon chromium bearing steel conforming to JIS, for example. The main bearing 50 may further include a cage or a separator.

Next, operation of the speed reducer 1 according to the first embodiment will be described.

First, when the motor (not shown) is driven, the input shaft 10 rotates at high speed. Accordingly, the centers of the first external gear 20 and the second external gear 21 rotate (revolve) about the center of the input shaft 10. Then, at every one turn of the input shaft 10, the outer teeth 27 (FIG. 8) of the first external gear 20 and the second external gear 21 sequentially contact the outer pins 31 adjacent to the outer teeth 27 in the circumferential directions. Accordingly, the first external gear 20 and the second external gear 21 rotate at low speed while revolving at high speed at the inner side of the outer pin holder 30 in the radial directions D2.

In this manner, the inner pin holder 40 is pushed circumferentially through the outer rings 62 of the inner pins 60 inscribed in the elongated holes 26 of the first external gear 20 and the second external gear 21, and rotates at low speed with rotation of the first external gear 20 and the second external gear 21. As a result, the inner ring 53 attached to the inner pin holder 40 (second holder portion 42) rotates at a speed lower than that of the input shaft 10. At this time, the input shaft 10 and the inner ring 53 rotate in opposite directions.

Advantages of the speed reducer 1 according to the first embodiment will now be described.

In the speed reducer 1, the end surfaces 46 of the pillars 43 are fixed to the first holder portion 41 with the bolts B1 inserted in the pillars 43 from the end surfaces 46. Thus, in the speed reducer 1, the bolts B1 do not need to be inserted in the shafts 61 of the inner pins 60. Accordingly, unlike the case of inserting the bolts B1 in the shafts 61, the speed reducer 1 enables reduction of the size of the inner pins 60. Thus, the speed reducer 1 can be reduced in size in the radial directions and, thereby, can be made in compact.

Second Embodiment

Next, a configuration of a cycloid speed reducer 2 (hereinafter referred to simply as a "speed reducer 2") according to a second embodiment will be described with reference to FIGS. 15 and 16. The speed reducer 2 according to the second embodiment has a configuration and advantages basically similar to those of the speed reducer 1 according to the first embodiment, but is different from the speed reducer 1 mainly in the number of external gears, for example. Hereinafter, only aspects different from the speed reducer 1 according to the first embodiment will be described.

Figure 15:
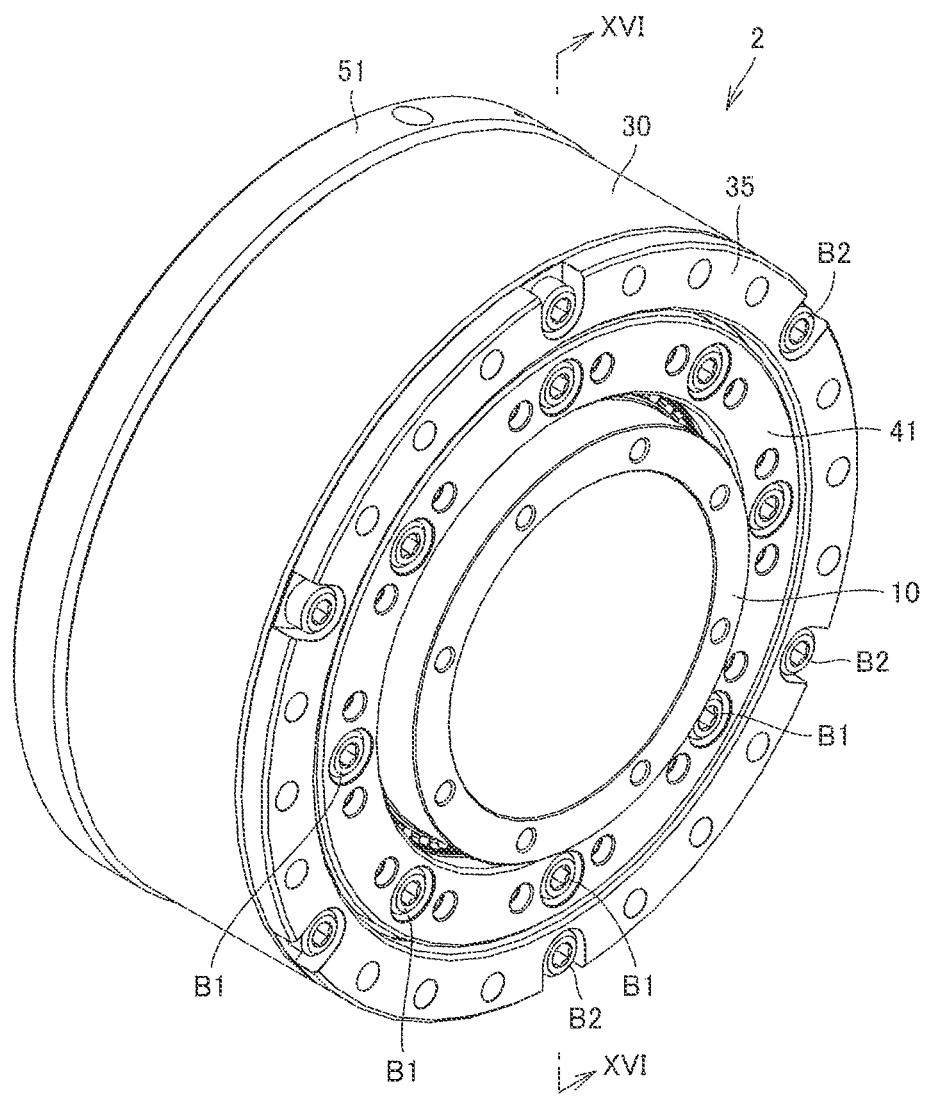
FIG. 15 is a perspective view illustrating an exterior configuration of a cycloid speed reducer according to a second embodiment.
Figure 16:
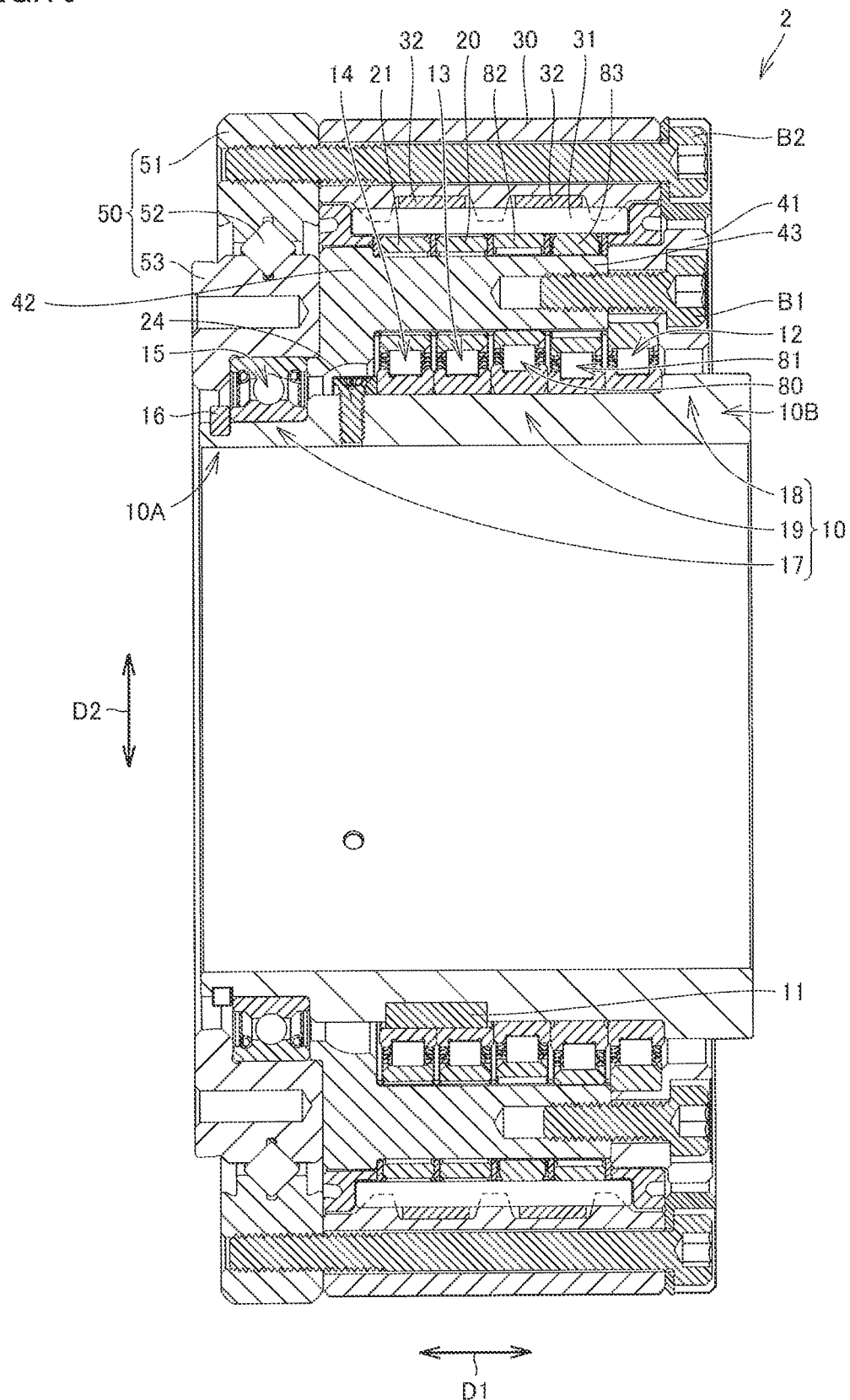
FIG. 16 is a cross-sectional view taken along line XVI-XVI in FIG. 15.

FIG. 15 is a perspective view illustrating an exterior configuration of the speed reducer 2 according to the second embodiment. FIG. 16 is a cross-sectional view taken along line XVI-XVI in FIG. 15. As illustrated in FIG. 16, the speed reducer 2 further includes a third external gear 82 and a fourth external gear 83, in addition to the first external gear 20 and the second external gear 21. A third eccentric bearing 80 is disposed between an inner circumferential surface of the third external gear 82 and an outer circumferential surface of the input shaft 10 (third shaft portion 19). A fourth eccentric bearing 81 is disposed between an inner circumferential surface of the fourth external gear 83 and an outer circumferential surface of the input shaft 10 (third shaft portion 19). The third external gear 82 and the fourth external gear 83 are cycloid gears similar to the first external gear 20. The third eccentric bearing 80 and the fourth eccentric bearing 81 are, for example, cylindrical roller bearings. As illustrated in FIG. 16, the second eccentric bearing 14, the first eccentric bearing 13, the third eccentric bearing 80, the fourth eccentric bearing 81, and the first support bearing 12 are arranged in this order from a first end 10A toward a second end 10B.

In the second embodiment, as compared to the first embodiment, the input shaft 10 and inner pins 60 are long in axial directions D1, and an outer pin holder 30 and an inner pin holder 40 are thick in the axial directions D1. Outer pins 31 are also long in the axial directions D1 with an increase in the number of external gears, and two outer pin lubricating members 32 are arranged in the axial directions D1. In the speed reducer 2 according to the second embodiment, an increase in the number of cycloid gears can obtain advantages such as an increase in allowable load torque, reduction of vibrations, and reduction of backlash. In FIG. 15, the outer pin holder 30 includes no through holes. However, the present disclosure is not limited to this example, and through holes may be formed in a manner similar to the first embodiment.

Other Embodiments

Other embodiments will now be described.

In the first embodiment, although the elongated holes 26 are described as examples of through holes, the present disclosure is not limited to this example, and the through holes may be complete circles.

The first holder portion 41 and the pillars 43 may be integrated and the end surfaces 46 of the pillars 43 may be fixed to the second holder portion 42 with the bolts B1.

The present disclosure is not limited to the case where the inner pins 60 are disposed to sandwich a corresponding one of the pillars 43 at both sides in the circumferential directions, and only one inner pin 60 may be disposed in the elongated hole 26.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

DESCRIPTION OF REFERENCE NUMERALS 1, 2 speed reducer, 10 input shaft, 10A first end, 10B second end, 11 key, 12 first support bearing, 13 first eccentric bearing, 14 second eccentric bearing, 15 second support bearing, 16 retaining ring, 16A notch, 17 first shaft portion, 18 second shaft portion, 19 third shaft portion, 19A keyway, 20 first external gear, 20A inner circumferential surface, 21 second external gear, 22 thrust washer, 23 retaining member, 23A upper surface, 23B lower surface, 24 fixing screw, 25 center hole, 26 elongated hole, 27 outer teeth, 30 outer pin holder, 30A through hole, 31 outer pin, 32 outer pin lubricating member, 32A first pin retention ring, 33 first pin restriction member, 33A second pin retention ring, 34 second pin restriction member, 35 external plate, 40 inner pin holder, 40A end surface, 41 first holder portion, 41A bolt hole, 42 second holder portion, 43 pillar, 43A female thread, 45 hole, 46 end surface, 50 main bearing, 51 outer ring, 52 roller, 53 inner ring, 54 seal, 60 inner pin, 61 shaft, 62 outer ring, 63 roller, 64 thrust washer, 70 inner pin lubricating member, 71 third projection, 72 first projection, 73 second projection, 74 back surface, 75 base portion, 80 third eccentric bearing, 81 fourth eccentric bearing, 82 third external gear, 83 fourth external gear, B1, B2, B3 bolt, D2 radial direction.

The invention claimed is:

1. A speed reducer comprising:
   a ring-shaped external gear including a plurality of outer teeth and having a plurality of through holes, the outer teeth being arranged on an outer circumferential surface of the external gear in circumferential directions, the through holes penetrating the external gear in axial directions and arranged in the circumferential directions;
   an input shaft penetrating space surrounded by an inner circumferential surface of the external gear and extending in the axial directions;
   a bearing disposed between the external gear and the input shaft and holding the input shaft such that the input shaft is rotatable relative to the external gear in the circumferential directions;
   a ring-shaped internal gear including a plurality of inner teeth and surrounding the outer circumferential surface of the external gear, the inner teeth being arranged on an inner circumferential surface of the internal gear and meshing with the outer teeth;
   a plurality of inner pins penetrating the through holes in the axial directions; and
   an inner pin holder holding both ends of each of the inner pins and having space, the input shaft penetrating the space, wherein
   the inner pin holder includes
   a first holder portion including a ring-shaped holding portion holding a first end of each of the inner pins,
   a second holder portion including a ring-shaped holding portion holding a second end of each of the inner pins, the second end being opposite to the first end, and
   pillars connecting the first holder portion and the second holder portion to each other, arranged at intervals in the circumferential directions, and penetrating the through holes,
   the speed reducer further comprises fixing members that fix end surfaces of the pillars to the first holder portion or the second holder portion and are inserted in the pillars from the end surfaces of the pillars,
   two inner pins of the inner pins and one pillar of the pillars are disposed in a same through hole of the through holes, and
   the two inner pins sandwich the one pillar in the circumferential direction.

2. The speed reducer according to claim 1, wherein
   a cross-sectional shape of each of the pillars perpendicular to longitudinal directions is an arc shape extending in the circumferential directions, and
   the through holes are elongated holes extending in the circumferential directions.

3. The speed reducer according to claim 1, wherein
   the inner pins are rolling bearings or plain bearings.

4. The speed reducer according to claim 1, further comprising lubricating members disposed inside the through holes and contacting the inner pins.

5. The speed reducer according to claim 4, wherein
   each of the lubricating members includes, in a cross section taken in a plane perpendicular to the axial directions,
   a base portion extending in the radial directions,
   a first projection projecting from a first end of the base portion,
   a second projection projecting from a second end of the base portion, the second end being opposite to the first end, and
   a third projection projecting from a portion of the base portion between the first end and the second end, and
   each of the lubricating members is swingable to achieve a first contact state in which the first projection and the third projection contact the inner pin and the second projection is separated from the inner pin and a second contact state in which the second projection and the third projection contact the inner pin and the first projection is separated from the inner pin.

6. The speed reducer according to claim 4, wherein
   the pillars have grooves in which the lubricating members are housed, and
   an outer shape of the grooves in a cross section perpendicular to longitudinal directions corresponds to the lubricating members.

* * * * *